United States Patent [19]

McKay et al.

[11] Patent Number: 5,586,813
[45] Date of Patent: Dec. 24, 1996

[54] ELECTRO-PNEUMATIC FREIGHT BRAKE CONTROL SYSTEM

[75] Inventors: Albert A. McKay, Stoney Creek; Eric G. Smith, Burlington, both of Canada

[73] Assignee: Westinghouse Air Brake Company, Wilmerding, Pa.

[21] Appl. No.: 429,450

[22] Filed: Apr. 27, 1995

[51] Int. Cl.⁶ ..................................................... B60T 8/18
[52] U.S. Cl. ...................................... 303/22.4; 303/9.69
[58] Field of Search ................................ 303/22.4, 22.6, 303/22.7, 3, 15, 9.69

[56] References Cited

U.S. PATENT DOCUMENTS 4,682,823  7/1987  Hommen et al. .................... 303/22.4

FOREIGN PATENT DOCUMENTS 2801778  7/1979  Germany ............................. 303/22.4
3312981  10/1984  Germany ............................. 303/22.4

*Primary Examiner*—Matthew C. Graham
*Attorney, Agent, or Firm*—Gary J. Falce

[57] ABSTRACT

An electro-pneumatic brake control system for a railroad car including application and release solenoid valves having a fail-safe configuration in which full emergency brake pressure is delivered in the event of a power loss due to a train break-in-two for example. The present invention discloses a pressure limiting valve for the purpose of limiting the maximum pressure capable of being delivered in accordance with the existing car load weight sensed by an electric load sensor at the time a power loss is experienced.

3 Claims, 3 Drawing Sheets

5,586,813

ELECTRO-PNEUMATIC FREIGHT BRAKE CONTROL SYSTEM

BACKGROUND OF THE INVENTION

The present invention is related to electro-pneumatic type brake systems for railroad freight cars and particularly to a car load compensating arrangement for preventing a wheel slide in the event of a fail-safe emergency brake application causing the electronic brake control to experience a power loss.

Electro-pneumatic brake systems that are suitable for railroad cars typically employ solenoid operated electro-pneumatic valves for directly pressurizing the car brake cylinder device under control of a microprocessor. Such systems have the potential for eliminating the need for a pneumatic back-up or emergency brake, since the solenoid valves can be arranged in a fail-safe configuration in which a source of compressed air is connected to the brake cylinder in a deenergized state. Such electro-pneumatic brake systems that employ a microprocessor have the further ability to perform the load control function electrically, thereby achieving more accurate, reliable, and economical brake control operation.

It is important to note, however, that without some means of retaining the load control function when a power loss occurs, the maximum pneumatic emergency brake cylinder pressure will be delivered in accordance with the fail-safe operation of the system solenoid valves. Accordingly, the potential exists for an empty or partially loaded car to slide its wheels when such an emergency occurs, which is undesirable from the standpoint of the high cost of wheel damage, not to mention the potential for derailment.

In order to realize the foregoing benefits attributed to an electro-pneumatic brake system, as above discussed, it is the object of the present invention to load limit brake cylinder pressure obtained in accordance with the fail-safe operation of the system solenoid valves in the event of a power loss that disables the electric load control.

It is an extension of the foregoing objective to proportion brake cylinder pressure in accordance with the car load condition to provide the aforementioned limit pressure.

Briefly, these objectives are carried out by means of a pressure limiting valve that is interposed in the delivery line leading from the application and release solenoid valves. An electric load sensor sets the maximum load limited brake cylinder pressure capable of being delivered by the limiting valve. The limiting valve arrangement is such that the load limited pressure setting is retained in the event a power loss occurs, causing the electric load sensor to be disabled.

BRIEF DESCRIPTION OF THE DRAWINGS

These and other objects and advantages of the present invention will become more apparent from the following detailed explanation when taken in conjunction with the accompanying drawings in which.

DESCRIPTION AND OPERATION

Figure 1:
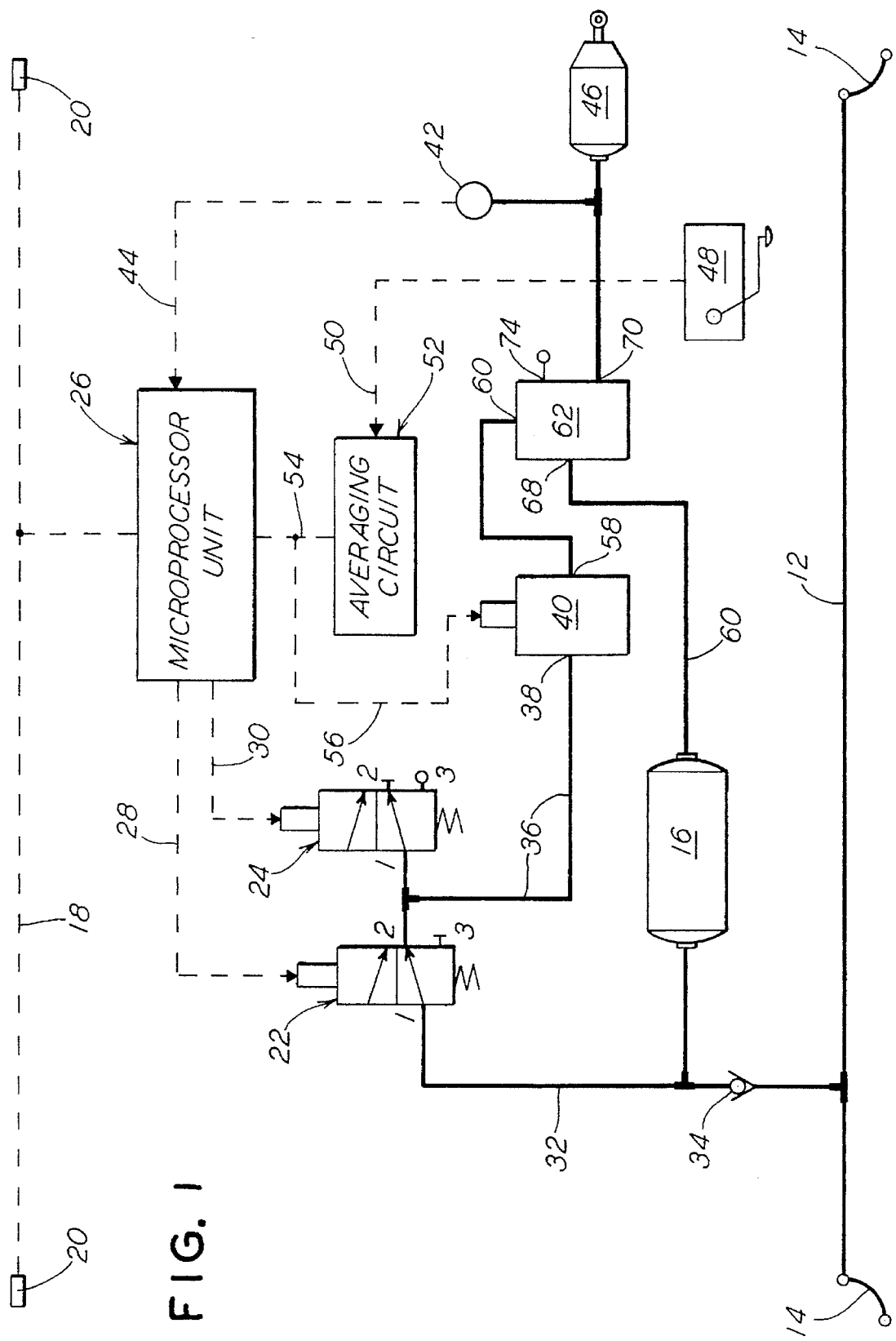
FIG. 1 is a diagrammatic view showing an electro-pneumatic brake system for a railroad car employing application and release solenoid valves arranged in a fail-safe configuration to provide emergency break-in-two protection, and an electric load control arrangement including a pressure limiting valve for load limiting the fail-safe emergency brake pressure according to the car load condition.

The electro-pneumatic brake control system 10 shown in FIG. 1 includes an air supply pipe 12 that extends the length of a railroad car and is arranged with hoses and couplings 14 at each end for connection with the hose couplings on adjacent cars in a train to provide a continuous train line via which a source of compressed air is connected from the train locomotive to a storage reservoir 16. Also extending the length of the railroad car is a control wire 18 that is connected to the control wire of adjacent cars in the train by suitable connectors 20 to provide a continuous train line control wire to which a source of electrical power is also supplied at the locomotive. Control wire 18 carries brake command signals and power to operate application and release control valves 22, 24 under control of a microprocessor 26 to which the control wire 18 is connected. Microprocessor 26 interprets the brake command signals and energizes appropriate application and release control wires 28, 30 for operating application and release control valves 22, 24 to obtain the desired brake control.

Application and release control valves 22, 24 are two-position, solenoid-operated, spring-returned valves having an inlet 1, an outlet 2, and an outlet 3. Inlet 1 of application control valve 22 is connected by a pipe 32 to air supply pipe 12 via a one-way check valve 34; outlet 2 is connected by piping 36 to inlet 1 of release control valve 24 and to the inlet port 38 of a pressure limiting valve 40; outlet 3 of application valve 22 is blanked and outlet 3 of release valve 24 is open to atmosphere.

When a brake command signal is transmitted via control wire 18, it is processed by microprocessor 26 in accordance with an electrical feedback signal corresponding to the car brake cylinder pressure and to another feedback signal corresponding to the car load weight. The brake cylinder pressure feedback signal is provided by a pressure transducer 42 that sends a signal to microprocessor 26 via a wire 44 indicative of the effective air pressure at brake cylinder 46. The car load weight feedback signal is generated by an electric load sensor 48 that provides a signal at wire 50 corresponding to the spring deflection of the car body relative to its truck, as a measure of the car load. An averaging circuit 52 modifies this load weight signal to negate the effect of car body rock and roll, in turn connecting the modified load weight feedback signal to controller 26 via wire 54 and to an electric motor associated with pressure limiting valve 40 via wire 56.

Assuming microprocessor 26 determines that brake cylinder pressure is inadequate to meet the load weighed brake command signal at wire 18, application and release wires 28 and 30 are deenergized, causing solenoid valves 22 and 24 to assume the positions shown, in which compressed air is connected from storage reservoir 16 to inlet port 38 of pressure limiting valve 40. Depending on the car load condition, as reflected by the averaged load weight signal effective at wire 54 and branch wire 56, pressure limiting valve 40 establishes a maximum pressure setting below which value the pressure at inlet port 38 is connected to outlet port 58 and thence to pilot port 60 of a relay valve 62 via pipe 64. Compressed air stored in reservoir 16 is connected via pipe 66 to supply port 68 of relay valve 62 and via delivery port 70 and pipe 72 to brake cylinder 46 at a pressure corresponding to the pilot port pressure, the air flow capacity of relay valve 62 being such as to quickly pressurize brake cylinder 46.

At the appropriate brake cylinder pressure as determined by microprocessor 26 in accordance with the instantaneous brake cylinder feedback signal from transducer 42 and the car load weight feedback signal provided by averaging circuit 52, application wire 28 is energized and application solenoid valve 22 is accordingly reset to its closed positioned. In this position, inlet 1 is connected to closed outlet port 3 to cut-off further supply of air to the pressure limiting valve inlet port 38, thereby establishing a lap condition in which a load compensated pneumatic brake pressure is obtained under electric control.

When it is desired to release the brakes, microprocessor 26 energizes release wire 30, as well as application wire 28, causing release valve 24 to be operated to its open position in which inlet 1 is connected to outlet 3. Pilot pressure effective at port 60 of relay valve 62 is thus vented to atmosphere via pressure limiting valve 40 and release solenoid valve 24. Relay valve 62 accordingly operates in response to the reduction of pressure at pilot port 60 to exhaust brake cylinder pressure at its vent port 74.

In the event a train break-in-two occurs, electric power supplied to microprocessor 26 via control wire 18 will be interrupted, thereby disabling the above-explained electric control of the car brakes. Application wire 28 and release wire 30 are thus deenergized, resulting in application solenoid valve 22 being forced to the shown open position by its return spring, while concurrently, release solenoid valve 24 is forced to the shown closed position by its return spring. This fail-safe configuration of the application and release solenoid valves is such that compressed air is supplied from reservoir 16 to brake cylinder 46 via the application and release control valves, the same as during the above-discussed electrically controlled brake application, irrespective of the fact that the supply of electric power has been interrupted. Since the above-mentioned train break-in-two results in a loss of air via the open supply pipe 12 at the location where the break-in-two occurs concurrent with the interruption of power to control wire 18, check valve 34 is provided to prevent the compressed air stored in reservoir 16 from escaping to atmosphere. This assures the availability of compressed air to provide emergency braking during a brake-in-two, as above-discussed, without the need to provide a separate pneumatic back-up brake control system on each car.

In that the interruption of electric power during a train break-in-two may also result in the averaged load weight signal at wire 54 being lost, it is important to note that the character of pressure limiting valve 40 is such that its previously set upper pressure limit is latched in, so that the loss of power to pressure limiting valve 40 does not affect the limiting valve pressure setting. This is the basis of the present invention, since without electric power, application and release control valves 22 and 24 remain in their fail-safe position, without the ability to control the degree of brake application.

Pressure limiting valve 40, however, having a locked-in maximum pressure setting according to the car load condition, operates to cut-off the supply of air from reservoir 16 to control port 60 of relay valve 62, when a pressure appropriate for the car load weight is realized. The brake cylinder pressure delivered to brake cylinder 46 via relay valve 62 is thus load compensated to prevent the undesirable condition of wheel slide under the emergency brake condition discussed.

Figure 2:
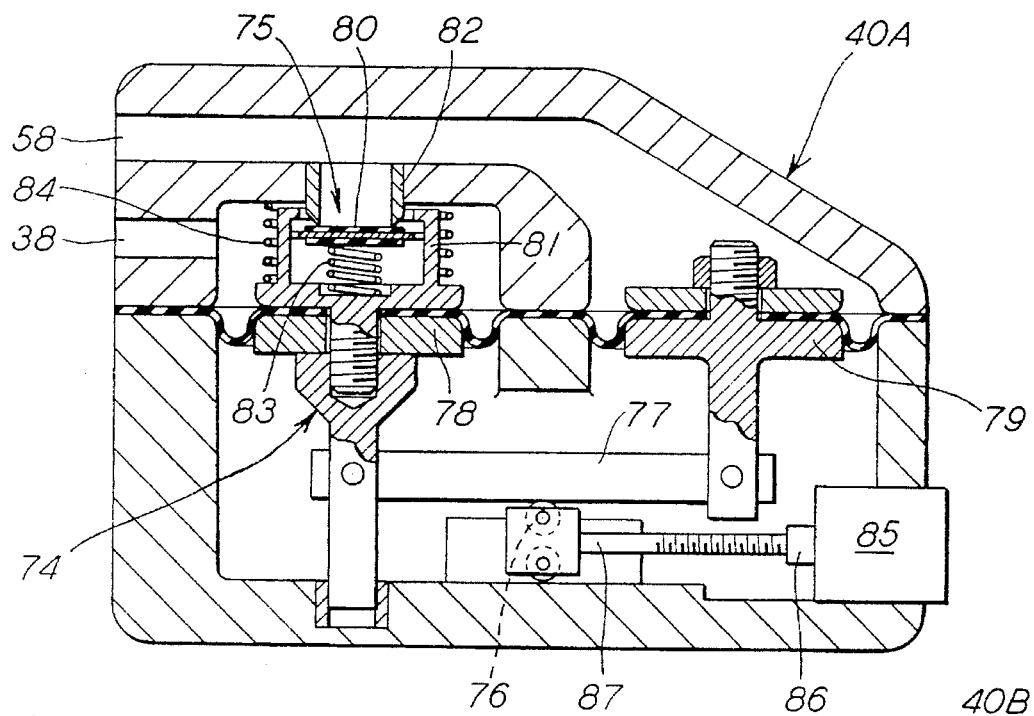
FIGS. 2, 3 and 4 are sectional assembly views showing various alternate pressure limiting valve arrangements suitable for use in the brake system of FIG. 1.

Referring now to FIG. 2, there is shown a limiting valve 40A having a piston assembly 74 and a valve assembly 75, the latter controlling communication of compressed air between an inlet port 38 and an outlet port 58 according to the pressure setting of the piston assembly. This pressure setting of the piston assembly is determined by the position of a moveable fulcrum member 76 that bears against a balance beam 77, the ends of which are pivotally connected to a control diaphragm piston 78 and a feedback diaphragm piston 79 of the piston assembly.

Valve assembly 75 comprises a disc valve element 80 housed in a cartridge 81 that is mounted on control piston 78 adjacent a fixed annular valve seat 82 in the limiting valve body. A release spring 83 between disc valve element 80 and cartridge 81 urges the valve element toward engagement with seat 82. A bias spring 84 between the limiting valve body and control piston 78 deflects piston 78 downwardly to a position in which cartridge 81 captures valve element 80 and maintains valve element 80 spaced apart from seat 82.

When a brake application is made, in accordance with the foregoing explanation relative to FIG. 1, compressed air is connected to inlet port 38 where it acts on piston 78 and passes via open valve element 80 to outlet port 58 and to feedback piston 79. When the force exerted by the air pressure acting on piston 79 and amplified by the effective ratio of balance beam 77 is sufficient to counter-act the combined force of air acting on piston 78 and the force of bias spring 84, piston 78 is forced upwardly to seat valve 80. Depending upon the position of fulcrum member 76, the relative sizes of pistons 78, 79 and the strength of bias spring 84, the delivery pressure at outlet 58 will be a predetermined proportion of the air pressure effective at inlet 38 when valve 80 closes. In that, the delivery pressure provided by limiting valve 40A of FIG. 2 is load modulated, the averaged load weight signal feedback to microprocessor 26 via wire 54 in FIG. 1 may be eliminated when employing the limiting valve 40A of FIG. 2.

The position of fulcrum member 76 along balance beam 77 is controlled by a motor 85 having an internally threaded output shaft 86 to which a threaded adjusting screw 87 of fulcrum member 76 is connected. Preferably, motor 85 is a stepping motor that incrementally rotates its output shaft in proportion to the load weight signal derived from averaging circuit 52 (FIG. 1) to in turn adjust the linear displacement of adjusting screw 87 and thereby locate the position of fulcrum member 76 in accordance with the car load condition. In the mid-position of fulcrum member 76 along balance beam 77, the car is assumed to be in a full load condition, so that if the relative sizes of pistons 78, 79 are equal, bias spring 84 will maintain valve element open by virtue of the balance beam being rotated in a counterclockwise direction. Accordingly, the pressure at inlet port 38 is effective at outlet port 58 on a 1:1 basis consistent with the assumed full load condition.

As the car load condition changes toward empty, the stepping motor output shaft is rotated in a direction to extend adjusting screw 27 and thus move fulcrum member 76 leftward from its mid-position to thereby change the effective ratio of balance beam 77 and accordingly change the proportion of air pressure effective at outlet port 58.

When a brake release is required, pressure at inlet port 38 is vented, allowing the greater pressure effective at outlet port 58 to unseat valve element 80 against its return spring 83. This in turn allows the outlet port pressure to follow the reducing pressure at inlet port 38 until the force exerted by pressure acting on feedback piston 79 is insufficient to overcome the opposing force of bias spring 84. When this occurs, piston 78 is forced downward to its normal position in which valve element 80 is captured by cartridge 81 and pulled off of its valve seat 82 to allow complete release of the pressure at outlet port 58.

It will now be appreciated that in the force balanced condition of piston assembly 74, as shown, valve element 80 is seated to interrupt pressure communication between inlet port 38 and outlet port 58, thereby isolating the brake cylinder delivery pressure from the brake cylinder supply pressure. In this manner, the proportioned pressure effective at outlet port 58 corresponds to the pressure setting dictated by the position of fulcrum member 78. It will be noted that in this position, as shown, balance beam 77 is substantially parallel with threaded rod 87 so that no linear counter force is transmitted to the screw 87 and the motor output shaft. Consequently, the position of fulcrum member 76 will remain unchanged in the event power is lost at motor 85, so that the proportioned pressure effective at outlet port 58 will be maintained constant irrespective of the emergency pressure developed at inlet port 38 in accordance with the aforementioned fail-safe operation of solenoid valves 22, 24 resulting from such power loss.

Figure 3:
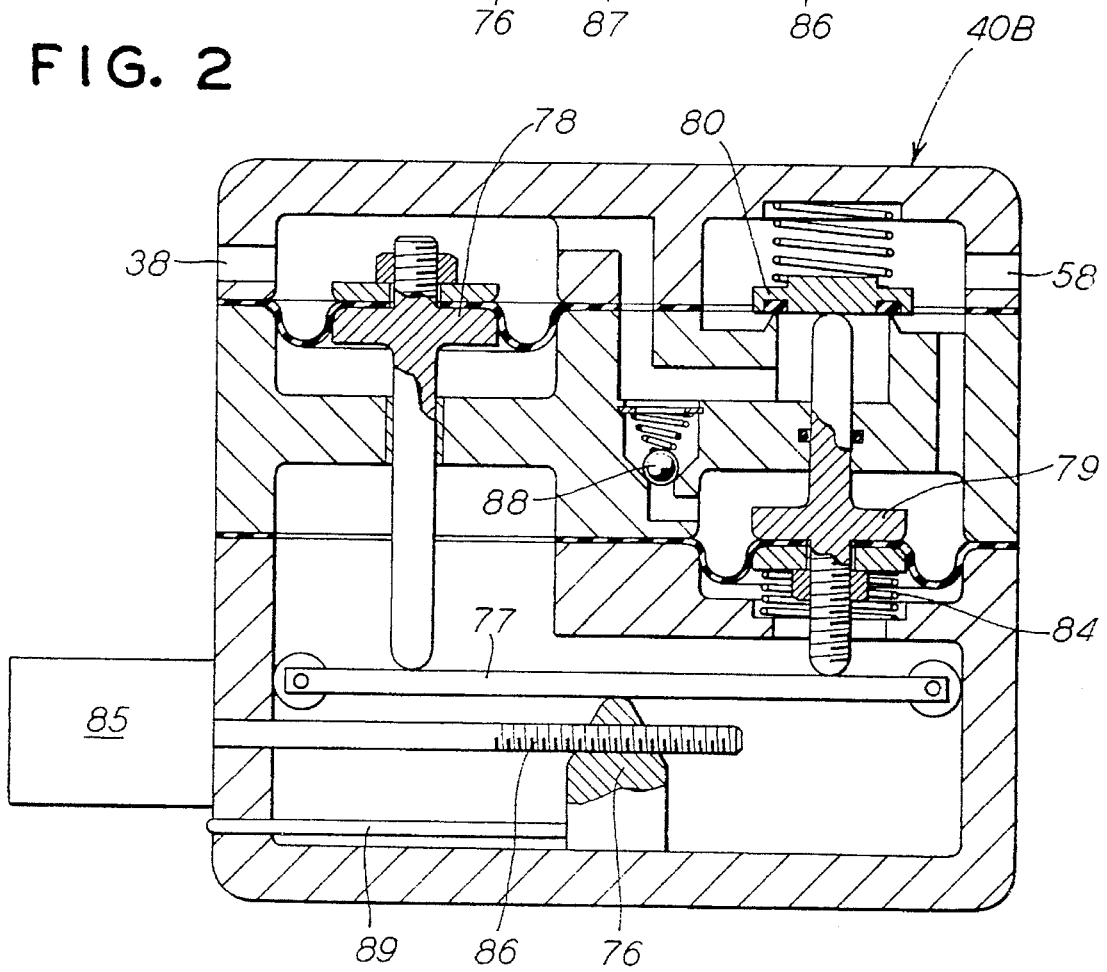

The limiting valve 40B shown in FIG. 3 is constructed and operates similar to that of FIG. 2, with corresponding reference numerals beings assigned to like ports. It will be seen that valve element 80 in FIG. 3 is associated with feedback piston 79 instead of control piston 78, as is bias spring 84. Also in FIG. 3, a separate release check valve 88 is provided between the supply and delivery sides of valve element 80, whereas in FIG. 2, the single valve element 80 serves as the release check valve, as well as the supply valve. Finally, the output shaft 86 of stepping motor 85 in FIG. 3 is formed with external screw threads that engage with internal threads in fulcrum member 76 to provide adjustment of the linear position of fulcrum member 76. An indicator rod 89 is attached to fulcrum member 76 and projects externally of the limiting valve body to provide a visual indication of the adjusted position of the fulcrum member and thus the railroad car load weight.

Figure 4:
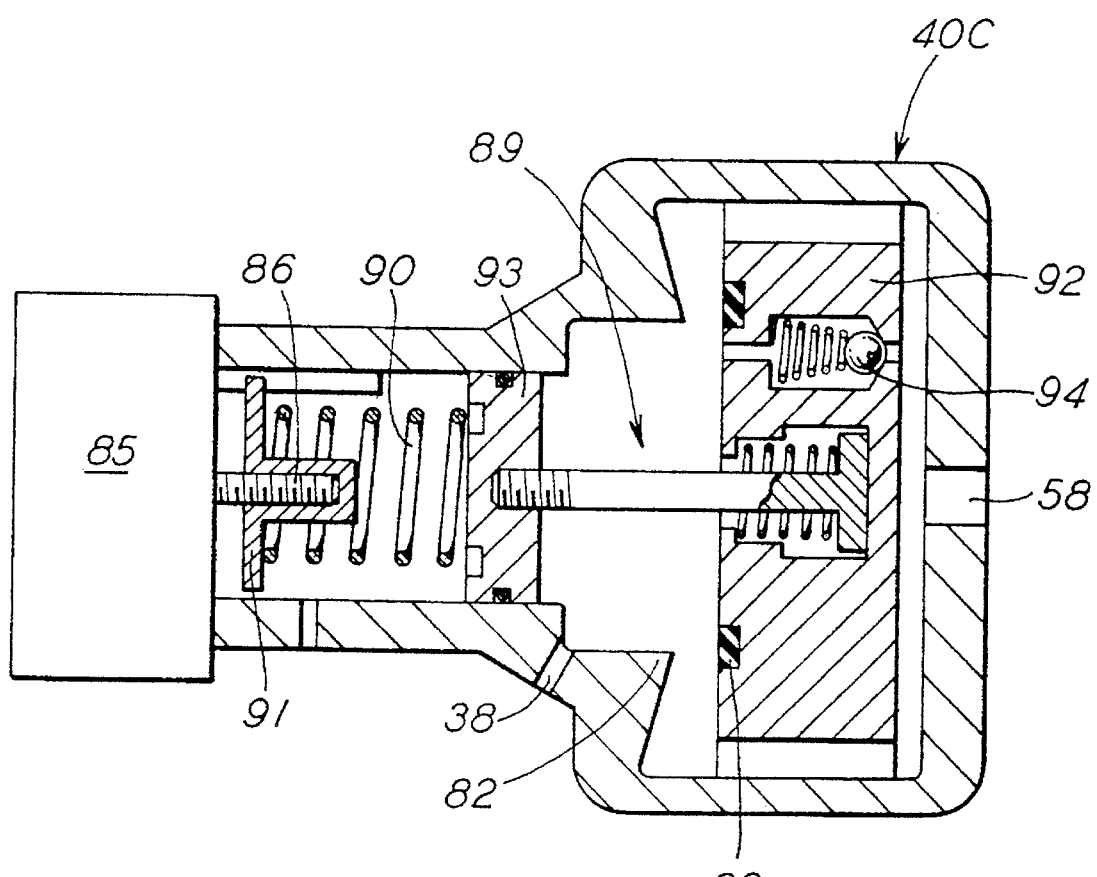

Limiting valve 40C shown in FIG. 4 differs from the previous arrangements in that a single differential piston assembly 89 is provided to proportion the pressure effective at outlet port 58 instead of separate control and feedback pistons; and a load adjustable proportioning spring 90 is provided to load modulate the output pressure instead of an adjustable fulcrum member acting through a balance beam. In this FIG. 4 arrangement, the same reference numerals as used in the arrangements of FIGS. 2 and 3 are used to identify like parts.

The output shaft 86 of stepping motor 85 is provided with shallow lead threads that engage with corresponding threads in an axially adjustable spring seat 91 that is keyed against rotation. Differential piston assembly 89 includes a larger area piston member 92 having an annular valve element 80 on one side that is engageable with a fixed valve seat 82, and a smaller area piston member 93 connected to the larger area piston 92 adjacent its one side. Disposed between smaller area piston 93 and spring seat 91 is proportioning spring 90, which urges piston assembly 89 in a direction to unseat valve element 80.

On a railroad car that is fully loaded, the car load weight signal causes stepping motor 85 to rotate its output shaft in a direction to cause spring seat 91 to move rightwardly a distance sufficient to obtain maximum compression of spring 90. In the aforementioned unseated condition of supply valve 80, compressed air effective at inlet port 38 flows past the open supply valve to outlet port 58 and concurrently acts on the side of piston member 93 opposite spring 90. The maximum force is selected such that full pressure at inlet port 38 is insufficient to compress spring 90 enough to seat valve element 80. Consequently, full air pressure is supplied to outlet port 58 consistent with the assumed full load weight signal at stepping motor 85.

Progressively lighter car load weights cause stepping motor 85 to retract spring seat 91 and thereby relax the force exerted by spring 90. Compressed air at inlet port 35 initially flows past unseated valve element 80 to outlet port 58 until the pressure acting on the side of piston member 93 exerts a force sufficient to overcome the force of spring 90. When this occurs, piston assembly 89 moves leftward until valve element 80 engages seat 82 to cut-off further flow of air to outlet port 58.

At this point, any further build-up of pressure at inlet port 38 causes piston valve assembly 89 to proportion the pressure effective at outlet port 58. The degree of proportioning is dependent on the relative pressure areas of piston members 92, 93, as well as the force exerted by proportioning spring 90.

In the event of a power loss such that the load weight signal controlling stepping motor 85 is absent, the existing compression of proportioning spring 90 will remain unchanged, since the shallow lead of the threads on the motor output shaft 86 preclude the spring force from retracting spring seat 86 from its set position, even though torque on the motor output shaft is absent due to the loss of motor power. Therefore, the pressure effective at outlet port 58 is assured of being load modulated to prevent the possibility of sliding wheels, as could otherwise occur due to the aforementioned fail-safe operation of solenoid valves 22, 24. As in the case of limiting valves of FIGS. 2 and 3, the fact that the delivery pressure is load modulated by the limiting valve itself makes it possible to eliminate the averaged load weight signal feedback to microprocessor 26 via wire 54 in FIG. 1.

When a brake release is required, the reduced pressure at inlet port 38 effective on the spring side of a release check valve 94 allows the greater pressure at outlet port 58 to open the check valve and follow the exhausting pressure from inlet 38. This causes the differential force on piston assembly 89 to be reversed, allowing valve element 80 to be unseated by virtue of rightward movement of piston assembly 89. When this occurs, output port pressure is exhausted via the unseated valve element 80 and inlet port 38.

We claim:

1. A railroad car brake control system comprising:

a) a source of fluid under pressure;

b) a brake cylinder device;

c) application and release control valve means interposed between said brake cylinder device and respective ones of said source of fluid under pressure and atmosphere;

d) electric communication means for conducting a brake command signal;

e) processor means for establishing and interrupting electrical communication between a source of electric power and said application and release control valve means in accordance with said brake command signal, said application and release control valve means in a deenergized condition establishing communication between said source of fluid under pressure and said brake cylinder device;

f) electric load sensing means for providing a car load signal corresponding to the load weight of said car; and g) pressure limiting valve means interposed between said application and release control valve means and said brake cylinder device, and subject to said car load weight signal for setting a maximum pressure limit above which the fluid pressure at said brake cylinder device is cut-off from said source of fluid under pressure, and for retaining the setting of said maximum pressure limit following a loss of said car load weight signal, wherein said limiting valve means includes:
  (i) an inlet connected to said application and release valve means;
  (ii) an outlet;
  (iii) a proportioning valve assembly including;
    (a) a differential area piston abutment;
    (b) a supply valve carried on said differential area piston abutment via which fluid under pressure effective at said input is connected to said outlet;
    (c) a load responsive piston connected to said differential area piston abutment and subject on one side to the fluid under pressure supplied to said inlet; and
  (iv) a non-rotatable spring seat spaced from the other side of said load responsive piston;
  (v) a proportioning spring in the space between said other side of said load responsive piston and said spring seat;
  (vi) electric motor means subject to said car load weight signal and having a screw-threaded output shaft threadedly engaged with said spring seat for adjusting the degree of compression of said spring in accordance with the degree of rotation of said output shaft, the degree of rotation of said output shaft being dependent on said car load weight signal, the fluid pressure effective at said outlet when said car load weight signal is absent in consequence of a loss of said source of electric power corresponding to said maximum pressure limit.

2. A brake control system as recited in claim 1, wherein the lead of the screw-threads of said output shaft have a steep angle of inclination whereby said adjusted compression of said spring is fixed when said car load weight signal is absent in consequence of said source of electric power being lost.

3. A brake control system as recited in claim 1, further comprising a release check valve in parallel with said supply valve between said inlet and said outlet.

* * * * *